Nov. 23, 1965    M. SZABO    3,219,160
COLLAPSIBLE FLAT-LYING LUGGAGE HANDLE
Filed June 22, 1964    2 Sheets-Sheet 2
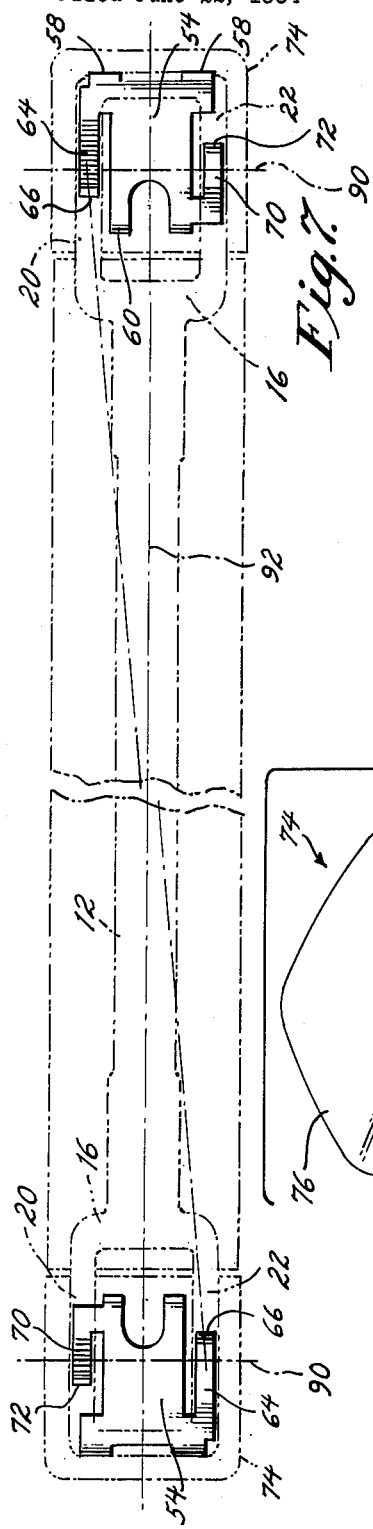
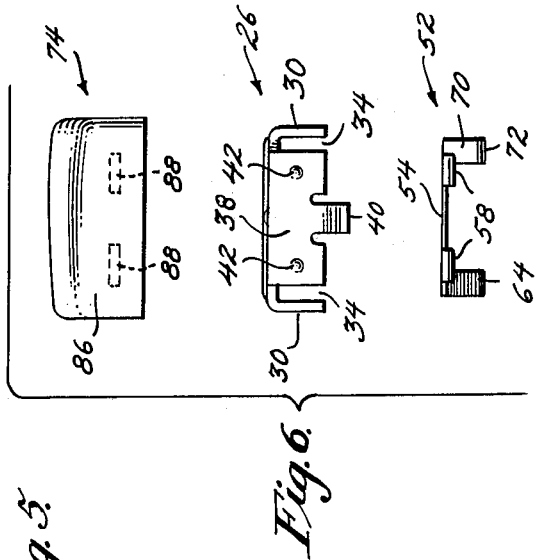
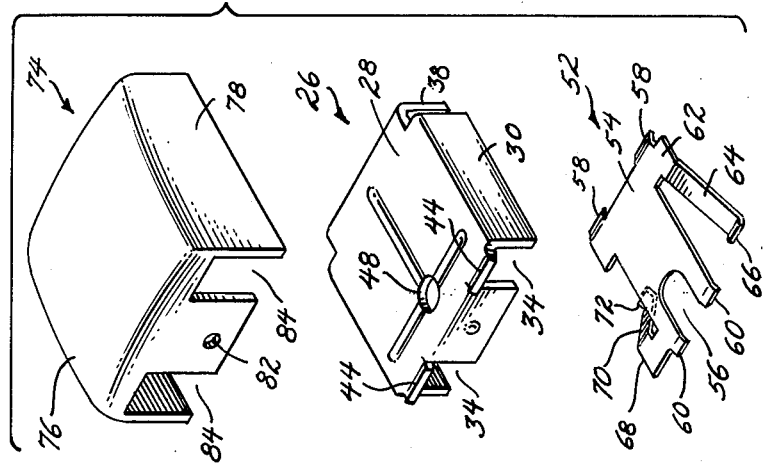
INVENTOR.
MARTON SZABO
BY
*Millman and Jacobs*
ATTORNEYS.

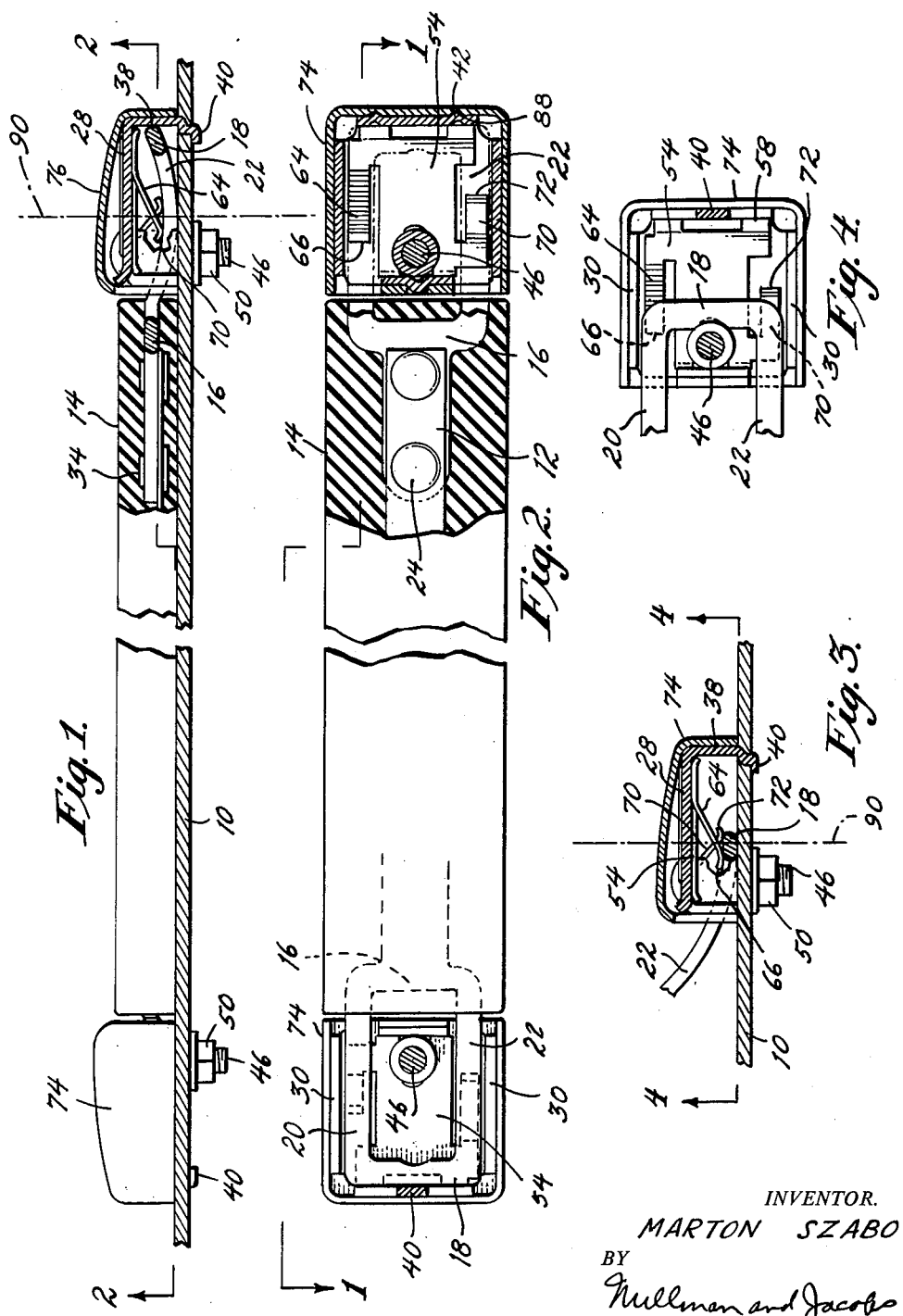

United States Patent Office 3,219,160
Patented Nov. 23, 1965

3,219,160
COLLAPSIBLE FLAT-LYING LUGGAGE HANDLE
Marton Szabo, Broomall, Pa., assignor to Philadelphia Handle Company, Inc., Camden, N.J., a corporation of New Jersey
Filed June 22, 1964, Ser. No. 376,688
6 Claims. (Cl. 190—58)

This invention relates to a handle for luggage, carrying cases and similar containers adapted to be pulled into an ached carrying position and to be readily collapsed into a flat non-carrying position against a wall of the container, and constitutes an improvement over the handle shown and described in my Patent No. 3,113,650.

In said patent spring members are provided each having a pair of forks or fingers of substantially the same length which extend in the same direction and act upon the link associated with each end of the handle to resiliently retain the same selectively in the collapsed and raised positions. In both positions both spring forks bear on the link along a line transversely across the link.

The primary object of the present invention is to provide a collapsible flat-lying handle of the character described in said Patent No. 3,113,650 wherein the forks or fingers of the spring member are so arranged that in both the collapsed and raised positions of the handle, the ends of the fingers bear against each link not along a line transversely across the link but rather at longitudinally spaced points to provide balancing pressure on the links and thereby improve the slide action of the handle and its rattle-resisting characteristics.

Another object of the invention is to provide a collapsible flat-lying handle of the character described in which the spring fingers are spaced longitudinally on either side of the transverse center line of each link when the handle is in its collapsed position.

Another object of the invention is to provide a collapsible flat-lying handle employing a pair of spring fingers to selectively retain the link at each end of a handle in a raised arched position and a collapsed flat-lying position, the pair of spring fingers at one end of the handle being so related to the pair of spring fingers at the other end of the handle as to restrain torque or twist around the longitudinal center line of the handle.

Yet another object of the invention is to provide a collapsible flat-lying handle employing a pair of spring fingers to selectively retain the link at each end of a handle in a raised arched position and a collapsed flat-lying position which is especially well adapted for relatively small handles as are required on small electronic instruments, portable radios, test equipment, portable television sets and the like.

These and other objects of the invention will become more apparent as the following description proceeds in conjunction with the accompanying drawings, wherein:

FIG. 1 is a longitudinal vertical sectional view through the handle in its collapsed flat-lying position taken on the line 1—1 of FIG. 2;

FIG. 2 is a sectional view taken on the line 2—2 of FIG. 1;

FIG. 3 is a fragmentary longitudinal sectional view similar to the right hand side of FIG. 1 and illustrating the retention of the handle in the arched carrying position;

FIG. 4 is a sectional view taken on the line 4—4 of FIG. 3;

FIG. 5 is a group perspective view of the guide housing, inner spring retaining member and spring;

FIG. 6 is an exploded elevational view looking at the rear or from right to left on FIG. 5; and FIG. 7 is a diagrammatic view somewhat similar to FIG. 2 and illustrating the relative positions of the springs at the ends of the handle.

Specific reference is now made to the drawings in which similar references are used for corresponding elements throughout.

The present invention relates to a handle construction of the type which is adapted to lie flat against a wall 10 of a piece of luggage to which it is attached, as shown in FIGS. 1 and 2, and to be pulled into an arched carrying position as shown in FIGS. 3 and 4. It is to be understood that the term "luggage" as used herein means briefcases, trunks, handbags, suitcases and any and all carrying cases, such for example as portable radios, phonographs, test equipment, television sets, etc. The handle includes an elongated strip or blade of steel spring 12 suitably covered by leather, plastic, rubber or other material 14. At each end of the grip, a link is provided consisting of a concavo-convex rectangular member having transverse members 16 and 18 joined by longitudinal members 20 and 22. The transverse member 16 of each link passes through a conventional hinge loop, see FIG. 1, and includes a bar which is riveted or otherwise secured as at 24 to each end of the spring 12.

The improved means to attach the ends of the handle to the wall 10 of the luggage will now be described, attention being particularly called to FIGS. 1–5. Since both ends of the handle are secured to the luggage by two of the same means, only one will be described hereafter.

A generally rectangular spring retainer member 26 is provided having an upper wall 28, a pair of side walls 30, a front wall 32 spaced from the side walls as at 34 and including a central protuberance or detent 36 and a rear wall 38 including a dependent central lug 40 and spaced protuberances or detents 42, see FIGS. 5 and 6. At its front end, the upper wall includes upwardly angulated lugs 44 above the spaces 34. The retainer member is secured to the case wall by a staked in screw 46 which extends through a hole 48 in the upper wall 28 and through a hole in the case wall 10 there to receive a nut 50. The dependent lug 40 is also made to extend through a suitable hole in the case wall 10, as shown in FIG. 3.

The front wall 32 confronts the end of the handle and the spaced openings 34 thereof slidably receive the longitudinal members 20 and 22 of the link, the transverse member 18 of the link being disposed in the retainer 26 between the front, rear and side walls thereof.

A resilient member 52 is provided, preferably made of spring steel and including a central flat portion 54 having a front opening slot 56 through which the shank of the screw 46 passes. The rear end of the central portion includes downwardly inclined lips 58 and the front end contains similar lips 60. Extending forwardly from a lateral edge of the rear of the portion 54 as at 62 is a downwardly and forwardly inclined spring finger 64 which is spaced from the central portion 54 for the major portion of its length and terminates in an upturned end 66. Extending rearwardly from a lateral edge of the front of the central portion 54 at a point 68 diagonally opposite that of position 62 is a rearwardly and downwardly inclined spring finger 70 of the same length and spacing as finger 64 and also terminating in an upturned end 72.

In assembly, the spring member 52 is pushed into the retainer 26 and there held in place by frictional engagement of the rear and front lips 58 and 60 with the rear and front walls 38 and 32, respectively, of the retainer, the shank of the staked-in screw 46 extending through the slot 56. Each link is then positioned in each assembled unit with concave side thereof facing upward, the outer transverse member 18 thereof disposed inside the retainer 26 below the spring 52 and the longitudinal members 20 and 22 thereof extending slidably through the opening 34 in the front wall of the retainer 26. The assembled unit is positioned on the case wall 10 with the lugs 40 extending into appropriate holes therein and the nuts 50 are screwed home from the inside of the case.

A closure cap 74 is provided which slips over and is removably retained on the retainer 26. It has an upper wall 76, depending side walls 78, a front wall 80 with a central hole 82 therethrough, the front wall being spaced from the side walls by downwardly opening slots 84, and a rear wall 86 with spaced indentations 88 at the inner surface thereof. When the cap is slipped over the retainer, the detent 36 of the front wall 32 of the retainer snaps into the hole 82 and the slots 84 of the cap align with the openings 34 of the retainer. At the rear, the detents 42 of the retainer rear wall 38 snap into the indentations 88.

It will be seen in the final assembly that when the handle is in its collapsed position, FIGS. 1, 2 and 7, the ends 66 and 72 of the springs 64 and 70 are spaced longitudinally of the handle and bear on the longitudinal members 20 and 22 on opposite sides of a line 90 which extends transversely substantially centrally between the transverse members 16 and 18 of each link to thereby balance the pressure on the links about said line 90. It will also be noted, from FIGS. 3 and 4, that in the arched raised position the end 66 of the forwardly extending spring finger 64 engages one of the longitudinal members of the link inwardly of the transverse member 18 while the end 72 of the rearwardly extending spring finger 70 engages the other longitudinal member of the link outwardly of the transverse member 18 thereby more securely retaining the handle in its raised position. Moreover, as seen in FIG. 7, the springs are so assembled on the ends of the handle that the forwardly extending spring 64 of one unit is diagonally opposite the spring 64 of the second unit and the same applies to the rearwardly extending springs 70. Thus, the most remote and the nearest pressure points of the spring fingers on the links are diagonally opposed and therefore resist twist or torque applied to the handle around its longitudinal axis 92.

While a preferred embodiment of the invention has been shown and described herein, it will be understood that a skilled artisan may make minor variations in the combination and arrangement of parts without departing from the spirit of the invention and the scope of the appended claims.

I claim:
1. A collapsible luggage handle comprised of a longitudinally flexible elongated hand grip portion capable of being arched to a carrying position and flattened to a non-carrying position, a spring in said hand grip portion normally urging the same into said flattened position, links connected to opposite ends of said hand grip portion and means slidably mounting each link upon a luggage wall, said means including a retainer having an upper wall and a slotted end wall to slidably receive said link, a resilient member in said retainer having laterally spaced fingers whose ends are spaced longitudinally and adapted to bear on said link to releasably and selectively retain said handle in said arched carrying and flattened non-carrying positions.

2. The combination of claim 1 wherein the ends of said spaced spring fingers bear on said link on both sides of the central transverse axis thereof when said handle is in its flattened non-carrying position.

3. The combination of claim 1 wherein each link includes a pair of longitudinal members joined by a transverse member slidable in said retainer, the end of one of said spaced spring fingers bearing on one of said longitudinal members inwardly of said transverse member and the end of the other of said fingers bearing on the other of said longitudinal members outwardly of said transverse member when said handle is in its arched carrying position.

4. The combination of claim 1 wherein said resilient member includes a substantially rectangular plate, said spring fingers being spaced laterally from the opposite sides of said plate and extending from diagonally opposite ends of said plate, said fingers being substantially of equal length.

5. The combination of claim 1 wherein one of the fingers of each resilient member extends inwardly towards the center of said hand grip and the other finger extends outwardly away from the center of the hand grip, the resilient members at both ends of said hand grip being so arranged that the inwardly extending fingers are diagonally opposed as are the outwardly extending fingers to restrain twist about the longitudinal axis of said hand grip.

6. The combination of claim 1 wherein the ends of one pair of said spring fingers of both resilient members which are most remote from the center of said hand grip are diagonally opposed as are those ends of the other pair of said spring fingers of both resilient members which are nearest the center of said hand grip to restrain twist about the longitudinal axis of said hand grip.

References Cited by the Examiner
UNITED STATES PATENTS 2,962,138  11/1960  Finkelstein _____ 190—57

FOREIGN PATENTS 306,230  3/1929  Great Britain.

JOSEPH R. LECLAIR, *Primary Examiner.*